(12) United States Patent
Braithwaite

(10) Patent No.: US 6,510,937 B1
(45) Date of Patent: Jan. 28, 2003

(54) APPARATUS FOR ALIGNING FABRICATED SNACK FOOD CHIPS

(75) Inventor: Steve Braithwaite, Allen, TX (US)

(73) Assignee: Recot, Inc., Pleasanton, CA (US)

( * ) Notice: Subject to any disclaimer, the term of this patent is extended or adjusted under 35 U.S.C. 154(b) by 102 days.

(21) Appl. No.: 09/722,681

(22) Filed: Nov. 28, 2000

(51) Int. Cl.$^7$ ............................................. B65G 47/24
(52) U.S. Cl. .................. 198/388; 198/462.2; 198/394
(58) Field of Search .............................. 198/383, 388, 198/462.2, 394

(56) References Cited

U.S. PATENT DOCUMENTS

| | | | | |
|---|---|---|---|---|
| 2,747,352 A | * | 5/1956 | Whitecar ..................... | 198/383 |
| 2,831,564 A | | 4/1958 | Pavesi | |
| 3,677,391 A | * | 7/1972 | Schaeffer .................. | 198/462.2 |
| 3,763,764 A | | 10/1973 | Schy | |
| 4,082,176 A | * | 4/1978 | Pommer ..................... | 198/411 |
| 4,098,392 A | * | 7/1978 | Greene ..................... | 198/419.3 |
| 4,619,832 A | | 10/1986 | Lutsey et al. | |
| 5,873,448 A | * | 2/1999 | Tsai et al. ................... | 198/360 |
| 6,000,524 A | * | 12/1999 | Vetruba ...................... | 198/383 |
| 6,338,606 B1 | * | 1/2002 | Bierschenk et al. ......... | 198/360 |

FOREIGN PATENT DOCUMENTS

| | | |
|---|---|---|
| FR | 2456480 A2 | 12/1980 |
| FR | 2757746 A1 | 7/1998 |
| WO | WO 00/75057 A1 | 12/2000 |

* cited by examiner

*Primary Examiner*—Christopher P. Ellis
*Assistant Examiner*—Richard Ridley
(74) *Attorney, Agent, or Firm*—Rothwell, Figg, Ernst & Manbeck

(57) ABSTRACT

An aligning apparatus for aligning food product chips having a generally curved shape includes a longitudinally extending rib positioned with respect to a chip transport surface. As chips are transported along the transport surface, they straddle the aligning rib with respective opposed side edges thereof supported on the transport surface. Engagement with the aligning rib causes the chips to become generally aligned with the aligning rib and thus, with each other.

14 Claims, 5 Drawing Sheets

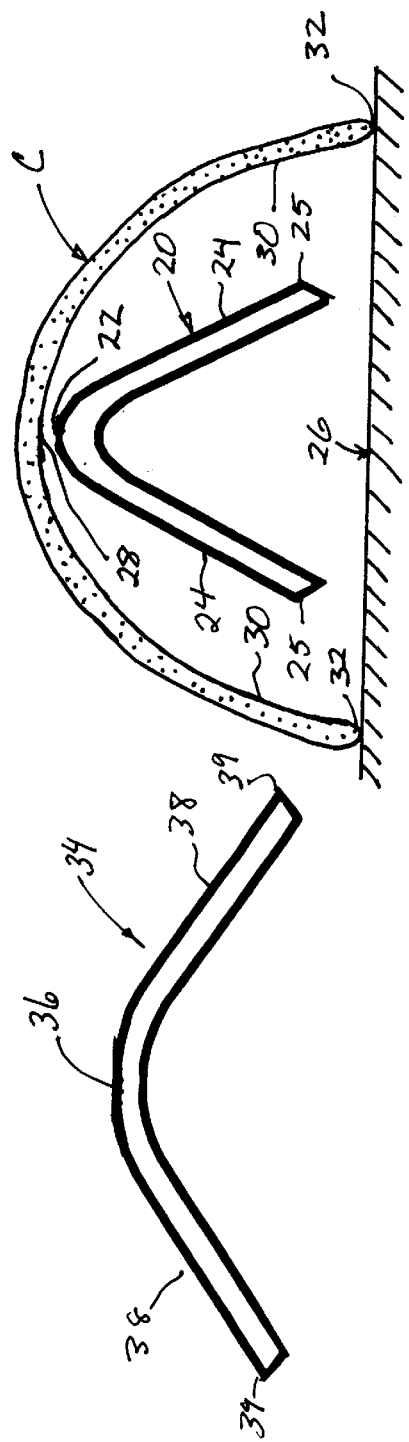
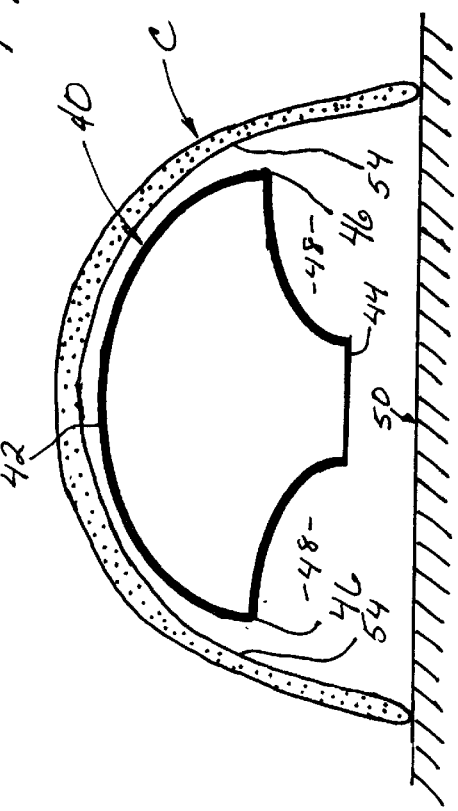

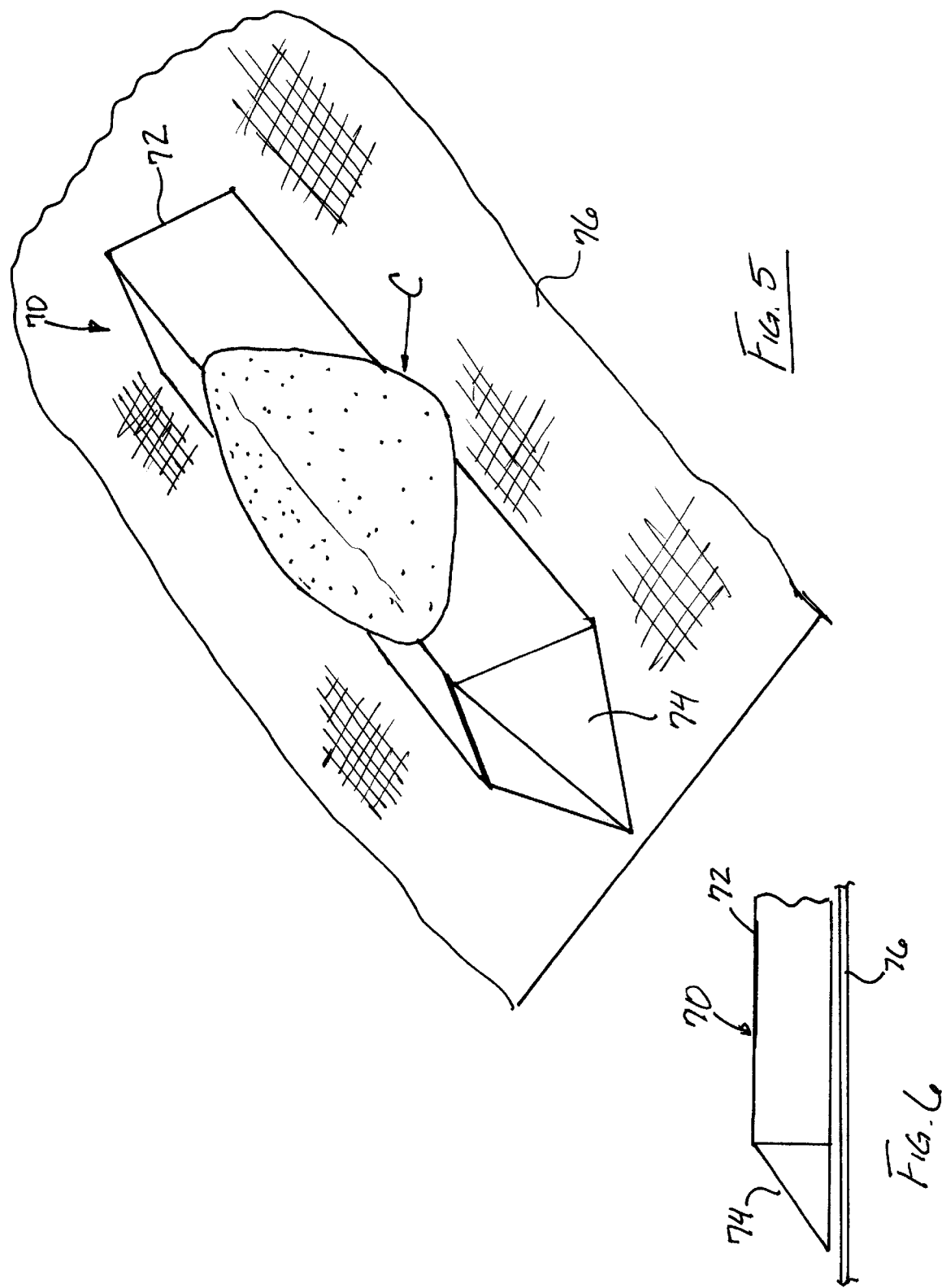

APPARATUS FOR ALIGNING FABRICATED SNACK FOOD CHIPS

FIELD OF THE INVENTION

The present invention relates generally to an apparatus and method for aligning fabricated snack food chips. More particularly, the invention relates to an apparatus and method for aligning, maintaining, and guiding the positions of curved snack food chips by contact with three points on the underside of the chip while the chip is on a moving conveyor (i.e., belted, mesh, or vibratory) during manipulation after frying and before packaging the chips in a stacked arrangement, e g., in a canister or other sleeve-type container or a tray.

BACKGROUND OF THE INVENTION

In general, snack food chips of various varieties possess characteristic shapes. For example, tortilla chips are one of the more popular types of snack food products and have come to be associated with having a triangular shape. Additionally, snack food chips which are used for dipping, e.g., potato chips, tortilla chips, or corn chips, preferably are curved to enhance the scooping ability of the chip as well as to add strength to the chip. Alternatively, chip strength may be enhanced by making the snack food chips ridged or sinusoidally wavy.

With respect to packaging, a stacked arrangement of snack food chips, e.g., in a cylindrical canister, has been found to be popular for a number of reasons. Such canisters purportedly offer some degree of protection against breakage of the snack food product and, due to the compact nature of the stacked arrangement of the chips, they provide greater transportability of the snack food products, both in terms of bulk transport (i.e., large cartons of the canisters being shipped, e.g., from the manufacturer to the retailer) as well as the individual consumer being able to transport a single package of chips (e.g., in a purse or in a picnic basket). Additionally, the extended shelf life of a sealed canister of snack food chips as compared to a bag (commonly pillow-shaped and frequently sealed with a generally inert gas to prevent product degradation), as well as the ability to reseal a canister with a snap-fit-type lid once the canister has been opened, makes a canister an attractive packaging option.

In order to manufacture and package form-fried snack food chips efficiently, it is necessary to maintain control over the product configuration and arrangement throughout the fabrication process. An important aspect of maintaining such control is ensuring that after the chips are fabricated, e.g. fried or baked, and while the chips are moving on down-stream transfer mechanisms, such as a conveyor belt or vibratory pan, the chips are arranged in aligned columns and are all oriented substantially the same way. Also, where the chips are being transported in rows of chips forming a plurality of side-by-side columns, it is sometimes desirable to change the spacings between adjacent columns of chips (e.g., spread them apart or contract them together) to accommodate downstream processing, such as application of oil and/or spices or packaging within a canister other sleeve-type container or a tray.

SUMMARY OF THE INVENTION

In accordance with principles of the present invention, an apparatus is provided for aligning and orienting each of a plurality of chips having a leading edge, a trailing edge, and opposed side edges, each chip having a generally similar curved shaped defining a concave surface and a convex surface extending from one side edge to the other. The apparatus comprises a transport mechanism, which transports the chips with their concave sides down and supported on the opposite side edges thereof, and an aligning rib. The aligning rib has a longitudinal extent and is engaged by each of the chips while being transported along at least a portion of the transport mechanism by straddling the rib with the opposed side edges thereof supported on the transport mechanism. The rib thus causes each chip which engages the rib to be generally oriented the same way as each other chip which engages the rib and causes each chip to be oriented so that an imaginary line extending from the leading edge to the trailing edge of the chip is generally aligned with the longitudinal extent of the rib.

Other objects, features, and characteristics of the present invention will become apparent upon consideration of the following description and the appended claims with reference to the accompanying drawings, all of which form a part of the specification, and wherein like reference numerals designate corresponding parts in the various figures.

BRIEF DESCRIPTION OF THE DRAWINGS

The invention will now be described in greater detail in connection with the drawings, in which:

FIG. 2A is an end view of a first embodiment of the aligning apparatus with a fabricated snack food chip engaged therewith.

FIG. 2B is an end view of a second embodiment of the aligning apparatus.

FIG. 2C is an end view of a third embodiment of the aligning apparatus with a fabricated snack food chip engaged therewith.

FIG. 5 is a perspective view of an alternate embodiment of an aligning apparatus according to the present invention.

FIG. 6 is a partial side elevation of the aligning apparatus of FIG. 5.

DETAILED DESCRIPTION OF PREFERRED EMBODIMENTS

With reference to the figures, exemplary embodiments of the invention will now be described. These embodiments illustrate principles of the invention and should not be construed as limiting the scope of the invention.

Figure 1:
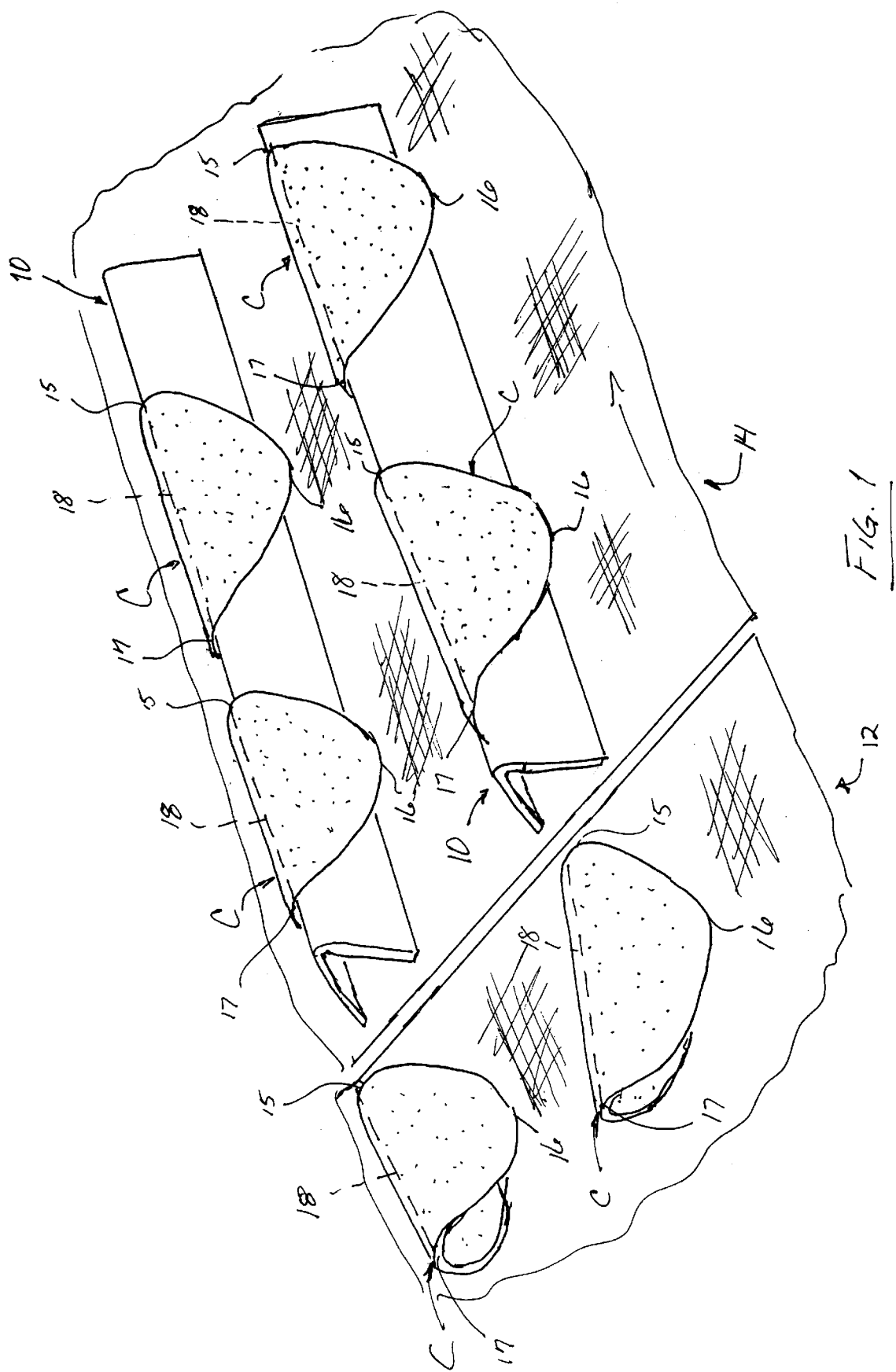
FIG. 1 is a perspective view of an aligning apparatus according to the present invention.

An aligning apparatus according to the present invention is shown in FIG. 1. The aligning apparatus is comprised of one or more elongated aligning ribs 10 disposed adjacent to a transport mechanism such as a vibratory plate or a conveyor belt. Alternatively, the aligning ribs 10 may be attached to and movable with the transport mechanism. Each chip C has a leading edge 15 and trailing edge 17, defined by the direction of travel of the transport mechanism, and opposed side edges 6. Each chip C is curved so as to define opposed concave and convex surfaces extending from one side edge to the other. The chips may be saddle shaped so that a surface of the chip may be concave from side to side and convex from leading edge to trailing edge. In the illustrated embodiment, the aligning ribs each comprise an extended three-dimensional shape that is slightly smaller than the dimensions of the chips C to be aligned thereby. More particularly, in the illustrated embodiment, the ribs 10 have an inverted V-shape. The chips C are initially disposed on an upstream transport mechanism 12 resting on their respective side edges 16. The chips C disposed on the upstream transport mechanism 12 are generally disoriented with respect to one another. When the chips C are transferred from the upstream transport mechanism 12 to the downstream transport mechanism 14, the chips engage the aligning ribs 10 which align the chips within each column with respect to one another and arrange the chips in generally the same orientation. In the context of the present invention, the chips are "aligned" when an imaginary line 18 extending from the leading edge 15 to the trailing edge 17 is generally parallel with a longitudinal axis (i.e., the direction of elongation) of the rib 10. In the illustrated embodiment, the aligning rib 10 is disposed slightly above the transport mechanism 14 and is held stationary with respect to the transport mechanism 14, which, in the illustration, is a conveyor belt. The aligning ribs 10 are shaped and dimensioned so that the chips which engage the ribs contact the rib at any of three points on the underside (i.e., the concave side) of the chip.

The rib is preferably made of a rigid, low friction material. Stainless steel and other like materials are suitable.

The two main types of fry patterns for a matrix of oval dough pieces that are to be fried into chips are straight and nested. A straight pattern is made of a plurality of rows of equally-spaced chips with the chips of each row generally located directly behind the corresponding chip in the preceding row. A nested pattern is made of equally-spaced pieces in rows that are shifted left or right from one row to the next. Therefore, the center line of each chip is generally midway between the center lines of the chips in the preceding row. Nested row spacing is reduced, as a portion of each generally oval chip now sits between the chips directly ahead of and behind it.

If chips are arranged in a nested pattern, the spacing between adjacent chips within one row will limit the width of the aligning rib that is to engage the chips of the following row, which chips are located between the chips of the preceding row.

FIGS. 2A and 2B show two embodiments of an inverted V-shape aligning rib constructed so as to accommodate different spacing within the rows of chips.

As shown in FIG. 2A, the aligning rib 20, being of a generally inverted V-shape, has a peak 22 and two depending sides 24 having marginal edges 25. Rib 20 of FIG. 2A is a relatively narrow rib for use when the spacing between adjacent chips in each row is limited. The height of the rib 20 is generally equal to or greater than the width of the rib 20. The rib 20 is disposed above the transport surface 26 and is preferably held stationary with respect thereto. The aligning rib 20 may also be movable with the transport surface 26, in which case it is not necessary that the rib 20 be suspended above the surface 26. The chip C with its bottom edges 32 resting on the transport surface 26 engages the aligning rib 20 by contacting the rib at any of three points on the underside of the chip C. Two side contact points 30 are wider than the maximum width of the aligning rib 20 at its marginal edges 25. The third point, namely a top contact point 28, is disposed above the two side contact points 30 but at a height that is slightly greater than the height of the peak 22 of the aligning rib 20. When the chip C is aligned with the rib 20, it does not contact the rib, as shown in FIG. 2A. When the chip is skewed with respect to the rib 20, the chip will contact the rib at or near one or more of the contact points 28, 30, thereby urging the chip into alignment with the rib.

Applying contact to a moving chip at or near any one or more of these three points will consistently carry or guide a chip in a known orientation and will correct some location variation during initial placement of the chip. The rib shape can be built into a flexible transport device to carry the chips; or it can be built into a vibratory or slide conveyor that allows chips to slide along it; or it can be fixed above a moving surface, as shown, such that chips are aligned by the rib and moved along it by the transport surface beneath the rib.

As shown in FIG. 2B, the aligning rib 34, like the aligning rib 20 shown in FIG. 2A, has a peak 36 that is preferably of a smooth curved shape, sides 38, and marginal edges 39. In general, it is preferable that the aligning rib be relatively wide and short. The rib 34 has a width that is greater than its height. The greater width of the aligning rib provides more orientation control because the width of the rib is closer to the actual width of the chip, thereby permitting less skewing of the chip with respect to the rib. Moreover, the lower height of the peak 36 allows the chips to initially engage the rib 34 even when the chips are initially significantly skewed from their preferred orientation.

On the other hand, in a nested chip configuration which does not allow for ribs having a width nearly as great as the maximum width of the chips, as with the rib 20 shown in FIG. 2A, there can be a relatively large gap between the edges 25 of the rib 20 and the side contact points 30 of the chip. In this case, orientation control is maintained by providing a rib 20 having a peak 22 that is closer to the height of the top contact point 28 of the chip C where the width of the chip is most narrow. A disadvantage of having a rib, such as rib 20, that has a height nearly as great as the height of the chip C is that if the chip C is initially skewed from the preferred orientation, a front edge of the chip may contact the end of the rib 20 at or near its peak 22 as the chips are moved along a transport mechanism into engagement with the rib, thereby blocking engagement of the chip (and all subsequent chips) with the rib 20.

Where an aligning rib is used in conjunction with a conveyor belt above which the aligning rib is disposed, once the chips are aligned and properly oriented, it is generally not necessary to provide an aligning rib for maintaining the orientation and alignment. The inventor has determined that such an aligning rib would be best used at the point of release of the chips from a device for transferring the chips from the baking or frying mechanism and extending down a subsequent conveyor belt for 10–15 inches.

FIGS. 5 and 6 show a modification of the aligning rib 10 shown in FIG. 1 which facilitates initial engagement of the chips C with the rib. Rib 70 in FIGS. 5 and 6 has a portion 72 having a normal shape, e.g. V-shaped, along which the chips C are aligned and properly oriented. A leading end 74 of the rib 70 is tapered to facilitate the initial engagement of the chip onto the rib 70. Both sides of the rib 70 are tapered laterally toward the centerline of the rib, and the top of the rib is tapered downwardly. The tapered leading end 74 facilitates initial engagement of the chip with the rib 70 by providing a more gradual engagement and by providing a pointed leading end to first engage the concave underside of the chips as they are moved into engagement with the rib 70.

Figure 4:
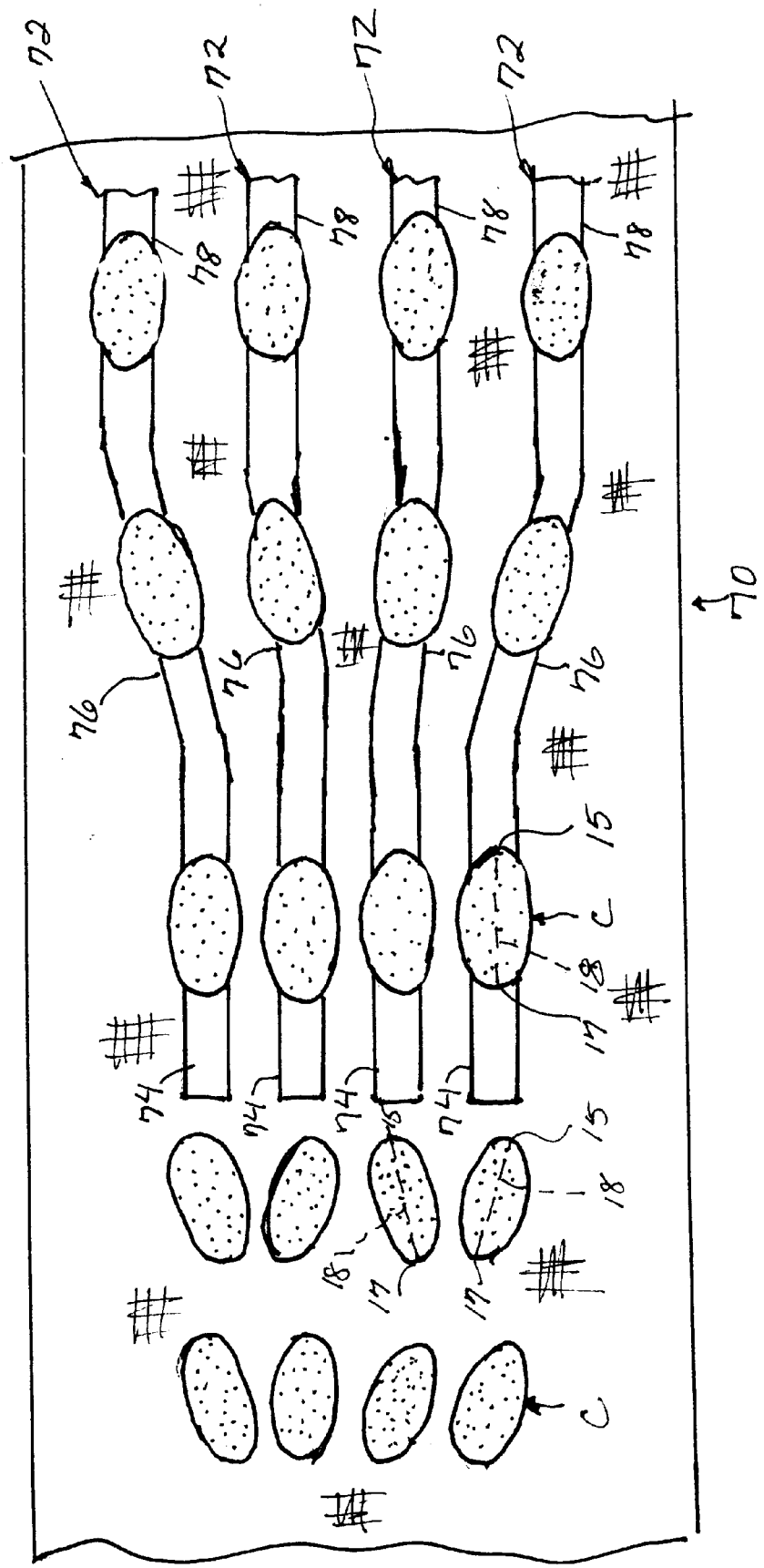
FIG. 4 is a plan view showing a second application of the aligning apparatus.

Depending on the chip pattern used, it may be necessary to spread the columns of chips apart prior to application of oil and/or seasoning. A narrow nested pattern will typically need to be spread in order to apply seasonings most efficiently. Spreading of the chips can be best accomplished by keeping the chips on the initial conveyor belt and causing the aligning ribs to diverge. This is illustrated in FIG. 4. A plurality of chips that are initially not aligned and are not properly oriented travel on belt 70 toward a plurality of aligning ribs 72. Upon engaging the initial portions 74 of the aligning ribs 72, the chips are aligned and properly oriented. In order to spread the columns of chips apart from one another, the aligning ribs 72 include diverging portions 76 at which the aligning ribs 72 are oriented obliquely to each other and diverge so that the space between adjacent ribs becomes greater until a desired spacing is achieved in the again parallel spaced portions 78 of the aligning ribs 72.

A preferred shape of an aligning rib for spreading chips on a conveyor belt is shown in FIG. 2C. The rib 40 has a generally mushroom shape of similar overall dimensions as the narrow inverted V-shape aligning rib 20 shown in FIG. 2A. The aligning rib 40 has a convex upper surface 42 and a base portion 44 preferably suspended above the transport surface 50. The sides of the aligning rib 40 have abrupt cutoff points at marginal edges 46 disposed above the level of the base 44, thereby defining open spaces 48 beneath the aligning rib 40. The abrupt edges 46 makes it more difficult for the conveyor to pull the chip over the rib as the rib diverges and is oriented at an angle with respect to the forward motion of the conveyor, thereby causing the chip to move laterally across the conveyor.

The inventor has determined that the angle of the diverging sections 76 of the aligning rib 72 is preferably at most 30° with respect to the initial center line of each column. As the rib diverges, the moving belt 70 pulls the chip down the rib and across the belt. If the rib is too wide and short, the friction between the belt and the chip will be great enough to pull the chip over the top of the rib. On the other hand, the rib must be smooth enough to permit the chip to slide down its length.

In the aligning and spreading ribs 72 shown in FIG. 4, it is not necessary that each portion 74, 76, 78 have an identical cross-sectional shape. For example, the initial portion 74 and the spaced portion 78 may have an aligning rib with an inverted V-shape such as shown in FIGS. 2A and 2B. As described above, however, the diverging portion 76 preferably has a spreading rib having a generally mushroom shape as shown in FIG. 2C.

For applying seasonings and/or oil to the chips, closing the space between chips in each column will better utilize the seasoning during application. Depending on the fry pattern employed, some spreading of the chips may be needed to get the pieces into separate columns before attempting to thereafter close the space between consecutive chips in each column. A seasoning application is more efficient if the target to be seasoned is continuous. Accordingly, slight shingling (i.e., overlap) of the chips within each column of chips will give a continuous ribbon target for application of the seasoning.

Figure 3:
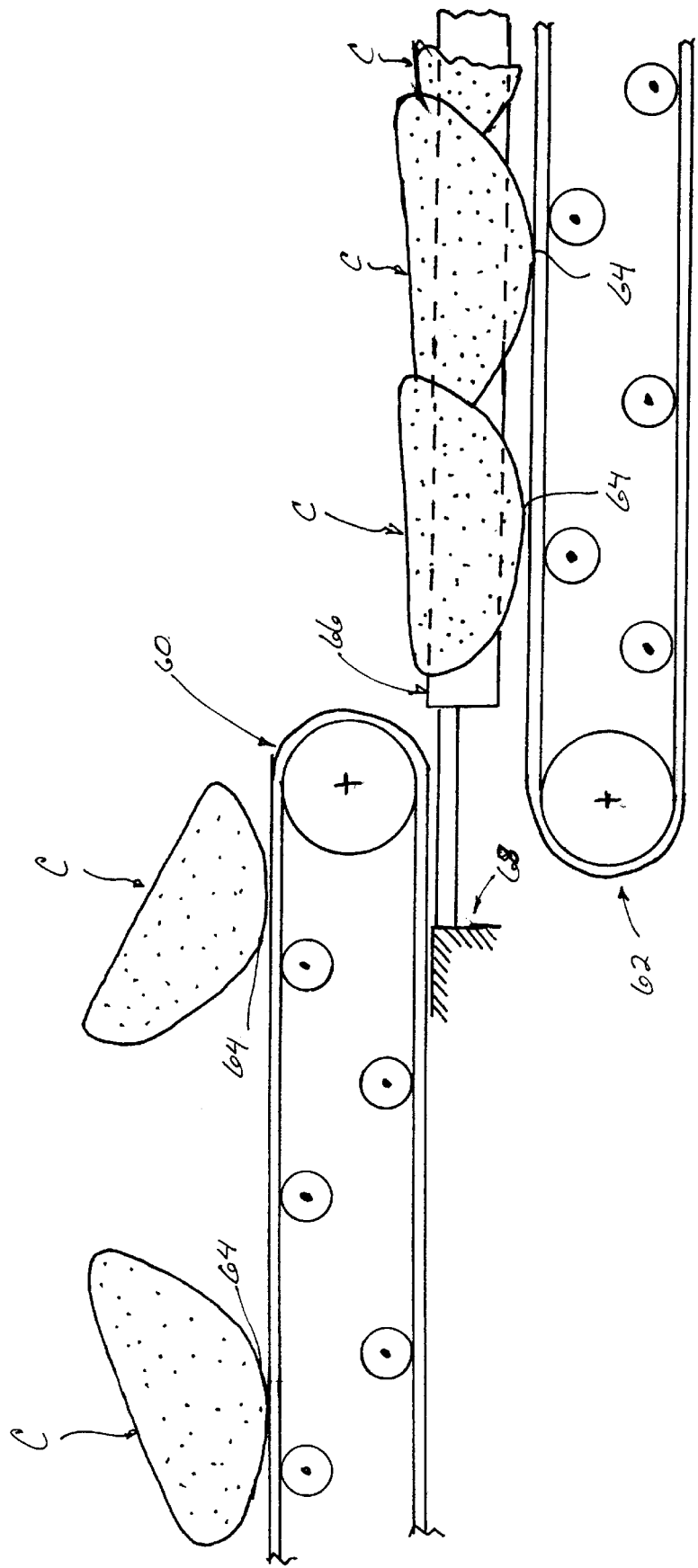
FIG. 3 is a partial side view showing an application of the aligning apparatus.

An apparatus for aligning and orienting the chips and for arranging each column of chips in a shingled pattern is shown in FIG. 3. In general, slight shingling is achieved by transferring chips C resting on their respective bottom edges 64 from a first conveyor belt 60 onto a second conveyor belt 62. The second belt 62 moves at a speed that is slightly slower than that of the first belt 60. An aligning rib 66 is arranged suspended above the surface of the second conveyor belt 62 and is appropriately mounted to an adjacent structure as schematically indicated at 68.

The chips C are initially disoriented and skewed while traveling on a first conveyor belt 60, which may comprise a transfer belt from a fryer or the like. The discharge end of the first belt 60 is disposed above a receiving end of the second belt 62 so that as the chips C are discharged off the end of the first belt 60, the chips land on and are thereafter transported by the second belt 62. The aligning rib 66 is positioned so that the chips will fall onto and straddle the aligning rib 66 and thus be aligned and properly oriented thereby.

The amount of speed change needed to achieve a desired amount of overlap in the shingled arrangement is determined by the desired change in center-to-center spacing of consecutive chips within each column. For example, if chips are received at 200 feet/minute at a center-to-center spacing of 3 inches in a column, and it is desired that the chips overlap by a quarter inch after being transferred to the second belt 62, the speed of the second belt would be 157 feet/minute.

With the chips arranged in distinct rows and columns and slightly shingled, they can be seasoned quite easily and efficiently.

A final spread of the chips is necessary to place each row of chips onto a slower, vibratory accumulation conveyor prior to loading the chips into a canister, a tray, or the like. If the chips are in slightly shingled, distinct columns, there may be a number of options for achieving the final spread.

If a constant speed is desired, the chips could be transferred to another, much wider belt moving at the same speed with diverging ribs (such as the diverging rib shown in FIG. 2C above) to spread the columns out to match up with the individual vibratory lanes for accumulation and loading into a canister, or tray, or the like. For this situation, overhead lane dividers could be used to spread the product. On the other hand, overhead lane dividers cannot be used earlier in the chip handling process because distinct product lanes are not available. Overhead lane dividers will cause product jams if distinct product lanes are not maintained, thus, the need for the aligning apparatus described herein.

If the speed of the conveyor was greatly reduced during the shingling procedure, then the lanes can be easily spread on a vibratory spreader using either diverging ribs or overhead lane dividers.

While the invention has been described in connection with what are presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the present invention can be made without departing from the novel aspects of this invention as defined in the following claims.

What is claimed is:

1. An apparatus for aligning and orienting each of a plurality of chips having a leading edge, a trailing edge, and opposed side edges, each chip having a generally similar curved shaped defining a concave surface and a convex surface extending from one side edge to the other, said apparatus comprising:

a transport mechanism constructed and arranged to transport the chips with their concave surfaces down and supported on the opposite side edges thereof; and an elongated aligning rib constructed and arranged to be engaged by each of the chips while being transported along at least a portion of said transport mechanism by straddling said rib with the opposed side edges thereof supported on said transport mechanism, and to cause each chip that engages said rib to be generally oriented the same way as each other chip which engages said rib and to cause each chip to be oriented so that an imaginary line extending from the leading edge to the trailing edge of the chip is generally aligned with the direction of elongation of said rib.

2. The apparatus according to claim 1, said transport mechanism comprising a first conveyor and a second conveyor, the chips being moved from said first conveyor to said second conveyor, said aligning rib being cooperatively disposed with respect to said second conveyor so that the chips engage said aligning rib when moving from said first conveyor to said second conveyor.

3. The apparatus according to claim 1, wherein said transport mechanism comprises a moving conveyor surface, said aligning rib being fixed with respect to said moving conveyor surface so that the chips slide along the aligning rib while being moved by said moving conveyor surface.

4. The apparatus according to claim 1, said aligning rib having a generally inverted V cross-sectional shape.

5. The apparatus according to claim 4, wherein said aligning rib has a height that is greater than its width.

6. The apparatus according to claim 4, wherein said aligning rib has a height that is less than its width.

7. The apparatus according to claim 1, wherein said aligning rib has a convex upper surface.

8. The apparatus according to claim 7, wherein said aligning rib has a base portion and said convex upper surface has marginal edges disposed above said base portion.

9. The apparatus according to claim 1, wherein said transport mechanism comprises a first conveyor belt and a second conveyor belt, said first conveyor belt being disposed above said second conveyor belt, and said second conveyor belt being longitudinally displaced with respect to said first conveyor belt so that chips ejected off an end of said first conveyor belt are deposited onto said second conveyor belt and are thereafter transported on said second conveyor belt, said aligning rib being fixed and disposed with respect to said second conveyor belt so that the chips falling from said first conveyor belt toward said second conveyor belt straddle said aligning rib with their opposed side edges supported on said second conveyor belt to thereby align the chips on said second conveyor belt.

10. The apparatus according to claim 9, wherein said first conveyor belt moves at a speed greater than that of said second conveyor belt so that after chips are transferred from said first conveyor belt to said second conveyor belt, each chip partially overlaps a preceding chip.

11. The apparatus according to claim 1, comprising a plurality of aligning ribs, each of said aligning ribs being generally parallel to one another.

12. The apparatus according to claim 1, comprising a plurality of aligning ribs, said aligning ribs including diverging portions arranged obliquely with respect to one another so as to cause columns of chips engaging said aligning ribs to move further apart or closer together to each other.

13. The apparatus according to claim 12, said aligning ribs having respective initial portions preceding said diverging portions, said initial portions being generally parallel to one another, and respective spaced portions following said diverging portions, said spaced portions being generally parallel to one another and being spaced apart further than said initial portions.

14. The apparatus according to claim 1, said aligning rib having a tapered leading end where chips moving on said transport mechanism first engage said aligning rib.

* * * * *